US011662495B2

(12) United States Patent
Chang et al.

(10) Patent No.: US 11,662,495 B2
(45) Date of Patent: May 30, 2023

(54) SONIC THROUGH TUBING CEMENT EVALUATION

(71) Applicant: Halliburton Energy Services, Inc., Houston, TX (US)

(72) Inventors: Chung Chang, Houston, TX (US); Qingtao Sun, Spring, TX (US); Randolph S. Coles, Spring, TX (US); Federico Lucas, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 338 days.

(21) Appl. No.: 16/909,479

(22) Filed: Jun. 23, 2020

(65) Prior Publication Data

US 2021/0123731 A1   Apr. 29, 2021

Related U.S. Application Data

(60) Provisional application No. 62/927,232, filed on Oct. 29, 2019.

(51) Int. Cl.
| | |
|---|---|
| *G01V 1/50* | (2006.01) |
| *G01V 1/46* | (2006.01) |
| *E21B 47/005* | (2012.01) |
| *G01B 17/02* | (2006.01) |

(52) U.S. Cl.
CPC .............. *G01V 1/50* (2013.01); *E21B 47/005* (2020.05); *G01B 17/02* (2013.01); *G01V 1/46* (2013.01); *G01V 2210/1295* (2013.01); *G01V 2210/1429* (2013.01)

(58) Field of Classification Search
CPC .......... G01V 1/50; E21B 47/005; G01B 17/02

USPC .............................. 367/25, 35; 181/102, 105
See application file for complete search history.

(56) References Cited

U.S. PATENT DOCUMENTS

| | | | | |
|---|---|---|---|---|
| 4,210,967 A | * | 7/1980 | Ingram | G01V 1/48 |
| | | | | 702/6 |
| 4,757,479 A | * | 7/1988 | Masson | G01V 1/44 |
| | | | | 181/105 |
| 9,477,002 B2 | | 10/2016 | Miller et al. | |
| 9,829,597 B2 | * | 11/2017 | Zeroug | G01V 1/50 |
| 2002/0157895 A1 | * | 10/2002 | Dubinsky | G01V 1/523 |
| | | | | 181/102 |
| 2006/0260864 A1 | * | 11/2006 | Egerev | G01V 1/523 |
| | | | | 181/102 |
| 2015/0136516 A1 | | 5/2015 | Chang et al. | |
| 2016/0033664 A1 | | 2/2016 | Cheng et al. | |
| 2018/0003843 A1 | | 1/2018 | Hori et al. | |
| 2018/0142545 A1 | | 5/2018 | Lei et al. | |

(Continued)

FOREIGN PATENT DOCUMENTS

| | | |
|---|---|---|
| WO | 2016187240 | 11/2016 |
| WO | 2019018100 | 1/2019 |

OTHER PUBLICATIONS

International Search Report and Written Opinion for Application No. PCT/US2020/040106, dated Oct. 5, 2020.

*Primary Examiner* — Ian J Lobo
(74) *Attorney, Agent, or Firm* — John Wustenberg; C. Tumey Law Group PLLC

(57) ABSTRACT

An acoustic logging tool may comprise a center load carrying pipe, a receiver module connected to the center load carrying pipe, one or more transmitter modules connected to the center load carrying pipe, and one or more mass modules connected to the center load carrying pipe.

20 Claims, 9 Drawing Sheets

(56) References Cited

U.S. PATENT DOCUMENTS

| | | |
|---|---|---|
| 2018/0149019 A1 | 5/2018 | Bose et al. |
| 2019/0129052 A1 | 5/2019 | Di et al. |
| 2019/0226319 A1* | 7/2019 | Espe .................. E21B 17/10 |
| 2019/0265199 A1 | 8/2019 | Zhao et al. |

* cited by examiner

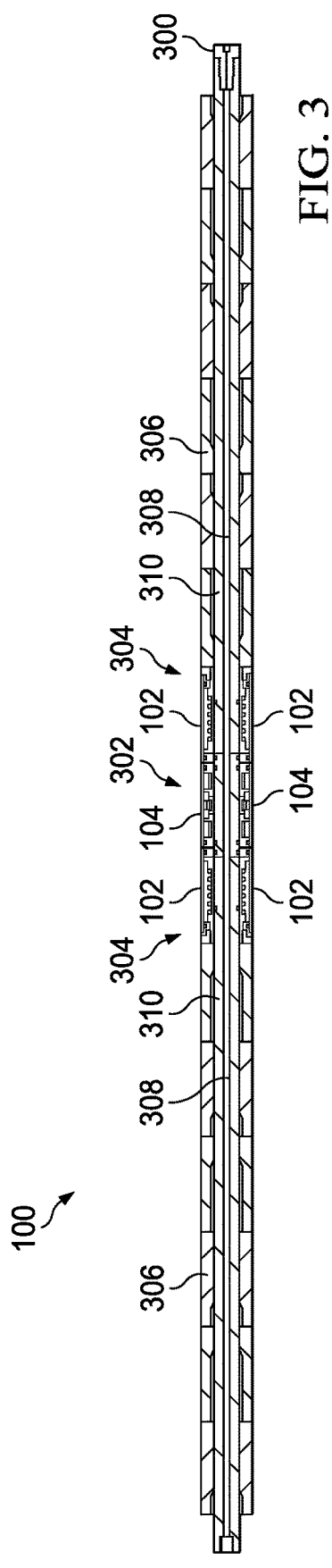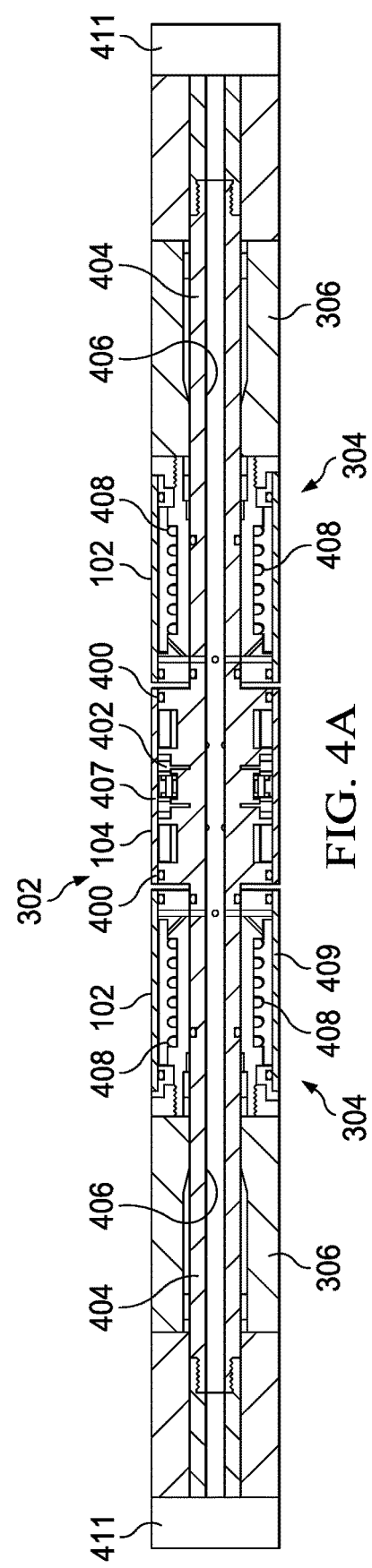

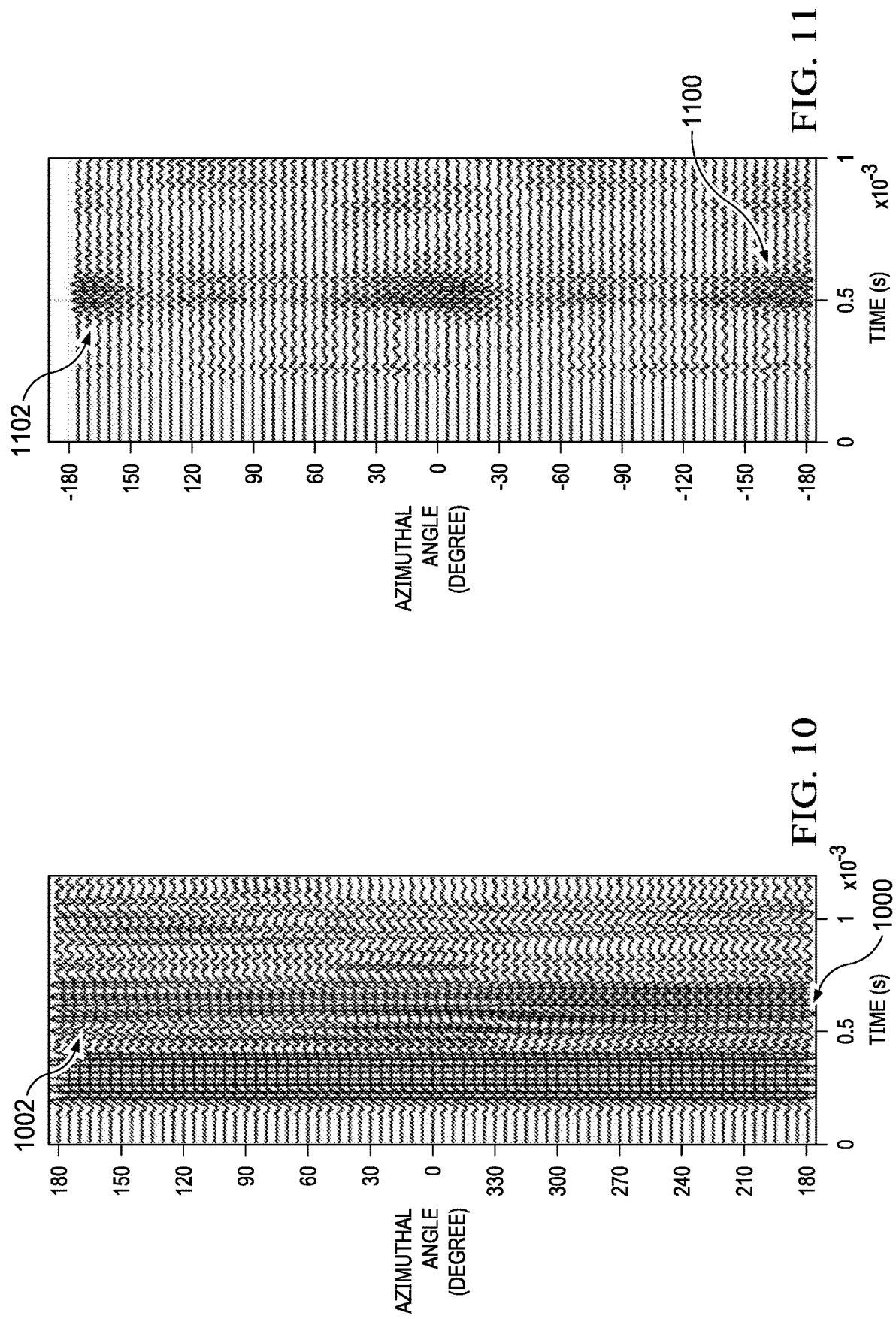

SONIC THROUGH TUBING CEMENT EVALUATION

BACKGROUND

In order to obtain hydrocarbons such as oil and gas, boreholes are drilled through hydrocarbon-bearing subsurface formations. Eventually, the boreholes are plugged and abandoned. Plugging and abandoning wells is controlled by local governments which place liability on companies for environment contamination. Therefore, ensuring proper integrity of the plugged well may prevent future litigation. Government regulations of placing a well barrier for permanent abandonment are often strenuous. For example, a cement barrier may have to be placed adjacent to an impermeable formation with sufficient formation integrity and extend across several hundreds of feet. The cement barrier may need to be verified, however, production tubing within the well may lead to unsatisfactory measurements from current tools and measurement methods.

BRIEF DESCRIPTION OF THE DRAWINGS

These drawings illustrate certain aspects of some examples of the present disclosure and should not be used to limit or define the disclosure.

FIG. 3 illustrates a cut away view of an example of an acoustic logging tool;

FIG. 4A illustrates a cut away view of an example of a receiver module and a transmitter module;

FIG. 10 illustrates a graph of a laboratory off-center monopole measurement;

FIG. 11 illustrates a graph of processed results, after removing a monopole component;

DETAILED DESCRIPTION

This disclosure may generally relate to systems and methods for an acoustic logging tool that measures and provides cement conditions for zonal isolation through production tubing. This may be advantageous as pulling production tubing from a well may not be required. As discussed below, the acoustic logging tool may be configured at a low frequency to minimize an acoustic effect created by the reflection of acoustic waves transmitted from the acoustic logging tool and reflected off the production tubing. The frequencies may range from 5 to 35 kHz. The acoustic logging tool may further preserve high fidelity waveform measurements without tool wave interferences. This may allow for the acoustic logging tool to measure an amplitude difference between a cemented and non-cemented annulus, which may range from 1% to 10%.

In certain examples, cement conditions may change along a length of the wellbore as well as along the wellbore's azimuthal direction. For angular measurement coverages, the acoustic logging tool may utilize inversion solutions to detect cement azimuthal changes. For example, to address azimuthal detectability, techniques may be employed to utilize an off-centered monopole, a dipole, and a uni-pole. In some examples, azimuthal detectability solutions may rotate the transmitter, a transmitter cover, or a tool body of the acoustic logging tool.

Figure 1:
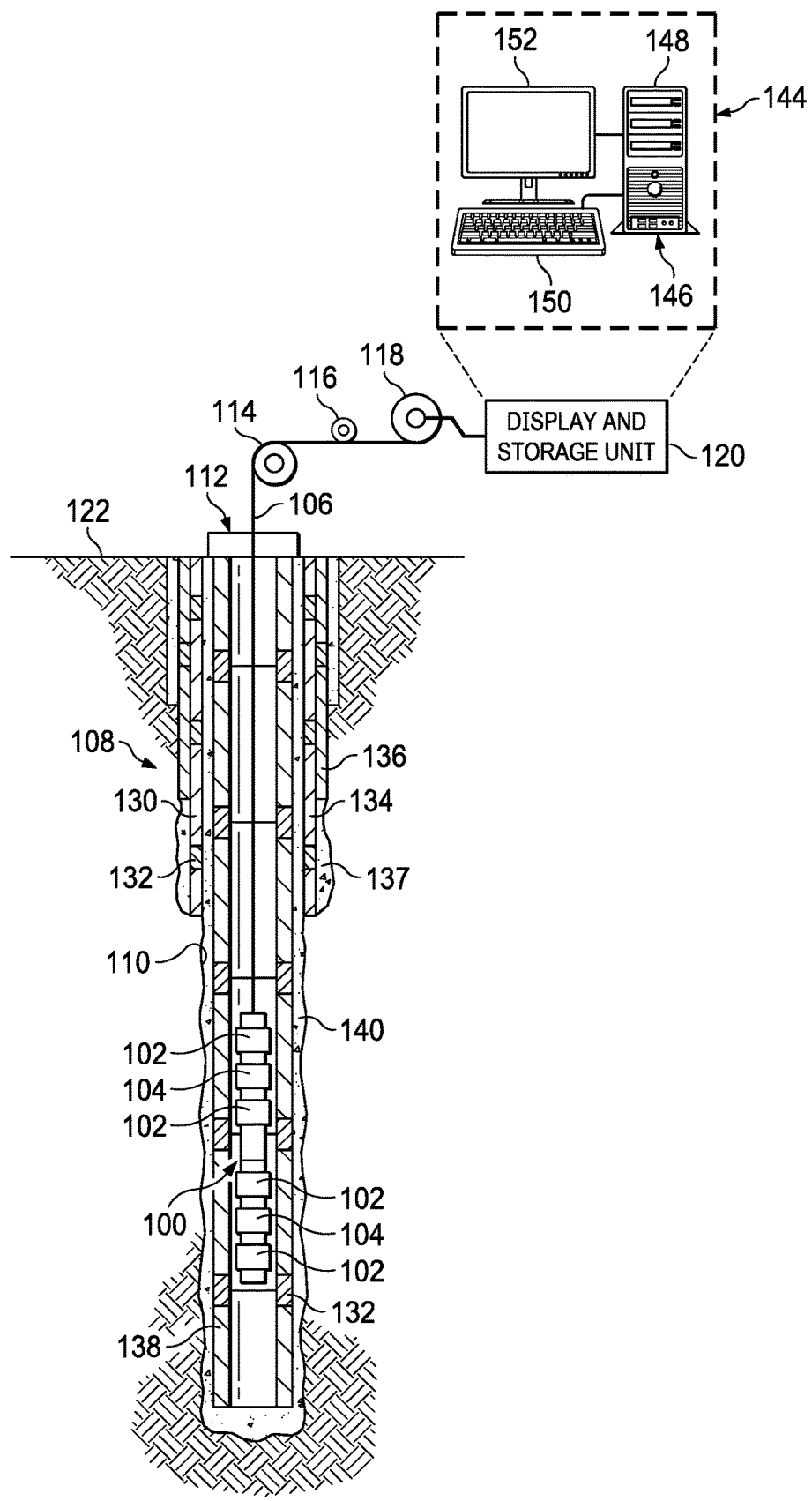
FIG. 1 illustrates an example of a wellbore acoustic logging system.

FIG. 1 illustrates an operating environment for an acoustic logging tool 100 as disclosed herein. The acoustic logging tool 100 may comprise a transmitter 102 and/or a receiver 104. In examples, there may be any number of transmitters 102 and/or any number of receivers 104, which may be disposed on the acoustic logging tool 100. A diameter of the acoustic logging tool 100 may range from 1 and 11/16 inches (4.3 centimeters) to 4 and ½ inches (11.4 centimeters). The acoustic logging tool 100 may be operatively coupled to a conveyance 106 (e.g., wireline, slickline, coiled tubing, pipe, downhole tractor, and/or the like) which may provide mechanical suspension, as well as electrical connectivity, for the acoustic logging tool 100. The conveyance 106 and the acoustic logging tool 100 may extend within a casing string 108 to a desired depth within a wellbore 110. The conveyance 106, which may include one or more electrical conductors, may exit a wellhead 112, may pass around a pulley 114, may engage an odometer 116, and may be reeled onto a winch 118, which may be employed to raise and lower a tool assembly in the wellbore 110. Signals recorded by the acoustic logging tool 100 may be stored on memory and then processed by display and storage unit 120, after recovery of the acoustic logging tool 100 from the wellbore 110. Alternatively, signals recorded by the acoustic logging tool 100 may be conducted to the display and storage unit 120 by way of the conveyance 106. The display and storage unit 120 may process the signals, and the information contained therein may be displayed for an operator to observe and stored for future processing and reference. Alternatively, signals may be processed downhole prior to receipt by the display and storage unit 120 or both downhole and at a surface 122, for example, by the display and storage unit 120. The display and storage unit 120 may also contain an apparatus for supplying control signals and power to the acoustic logging tool 100. The casing string 108 may extend from the wellhead 112 at or above ground level to a selected depth within the wellbore 110. The casing string 108 may comprise a plurality of joints 130 or segments of the casing string 108, each joint 130 being connected to the adjacent segments by a collar 132. In examples, the casing string 108 may be held in place by cement 137. There may be any number of layers in the casing string 108. For example, a first casing 134 and a second casing 136. It should be noted that there may be any number of casing layers.

FIG. 1 also illustrates production tubing 138, which may be positioned inside of the casing string 108 extending part of the distance down the wellbore 110. The production tubing 138 may be production tubing, tubing string, casing string, or other pipe disposed within casing string 108. The production tubing 138 may comprise concentric pipes. It should be noted that concentric pipes may be connected by collars 132. The acoustic logging tool 100 may be dimensioned so that it may be lowered into the wellbore 110 through the production tubing 138, thus avoiding the difficulty and expense associated with pulling the production tubing 138 out of the wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to the acoustic logging tool 100 by a power supply located above ground level, and data may be coupled to the DC power conductor by a baseband current pulse system. Alternatively, the acoustic logging tool 100 may be powered by batteries located within the downhole tool assembly, and/or the data provided by the acoustic logging tool 100 may be stored within a downhole tool assembly, rather than transmitted to the surface 122 during logging.

The acoustic logging tool 100 may be used for excitation of the transmitter 102. As illustrated, one or more receiver 104 may be positioned on the acoustic logging tool 100 at selected distances (e.g., axial spacing) away from transmitter 102. The axial spacing of receiver 104 from transmitter 102 may vary, for example, from about 0 inches (0 cm) to about 40 inches (101.6 cm) or more. In some examples, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. The transmitters 102 may include any suitable acoustic source for generating acoustic waves downhole, including, but not limited to, an off-centered monopole, a dipole, and a unipole or other multipole sources (e.g., dipole, cross-dipole, quadrupole, hexapole, or higher order multi-pole transmitters). Specific examples of suitable transmitters 102 may include, but are not limited to, piezoelectric elements, bender bars, or other transducers suitable for generating an excitation downhole. An excitation may be an acoustic wave, pressure pulse, radio wave, electromagnetic field, and/or the like. The receiver 104 may include any suitable acoustic receiver suitable for use downhole, including piezoelectric elements that may convert acoustic waves into an electric signal or hydrophones. Additionally, the receiver 104 may be able to record any reflected excitation that was transmitted from the transmitter 102 and reflected off an object in the wellbore 110.

With continued reference to FIG. 1, transmission of acoustic waves by the transmitter 102 and the recordation of signals by the receivers 104 may be controlled by the display and storage unit 120, which may include an information handling system 144. As illustrated, the information handling system 144 may be a component of the display and storage unit 120. Alternatively, the information handling system 144 may be a component of the acoustic logging tool 100. The information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. The information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the acoustic logging tool 100 and/or software executed by processing unit 146. For example, the information handling system 144 may enable personnel to view a receiver array response, select analysis options, view collected log data, view analysis results, and/or perform other tasks.

Figure 2:
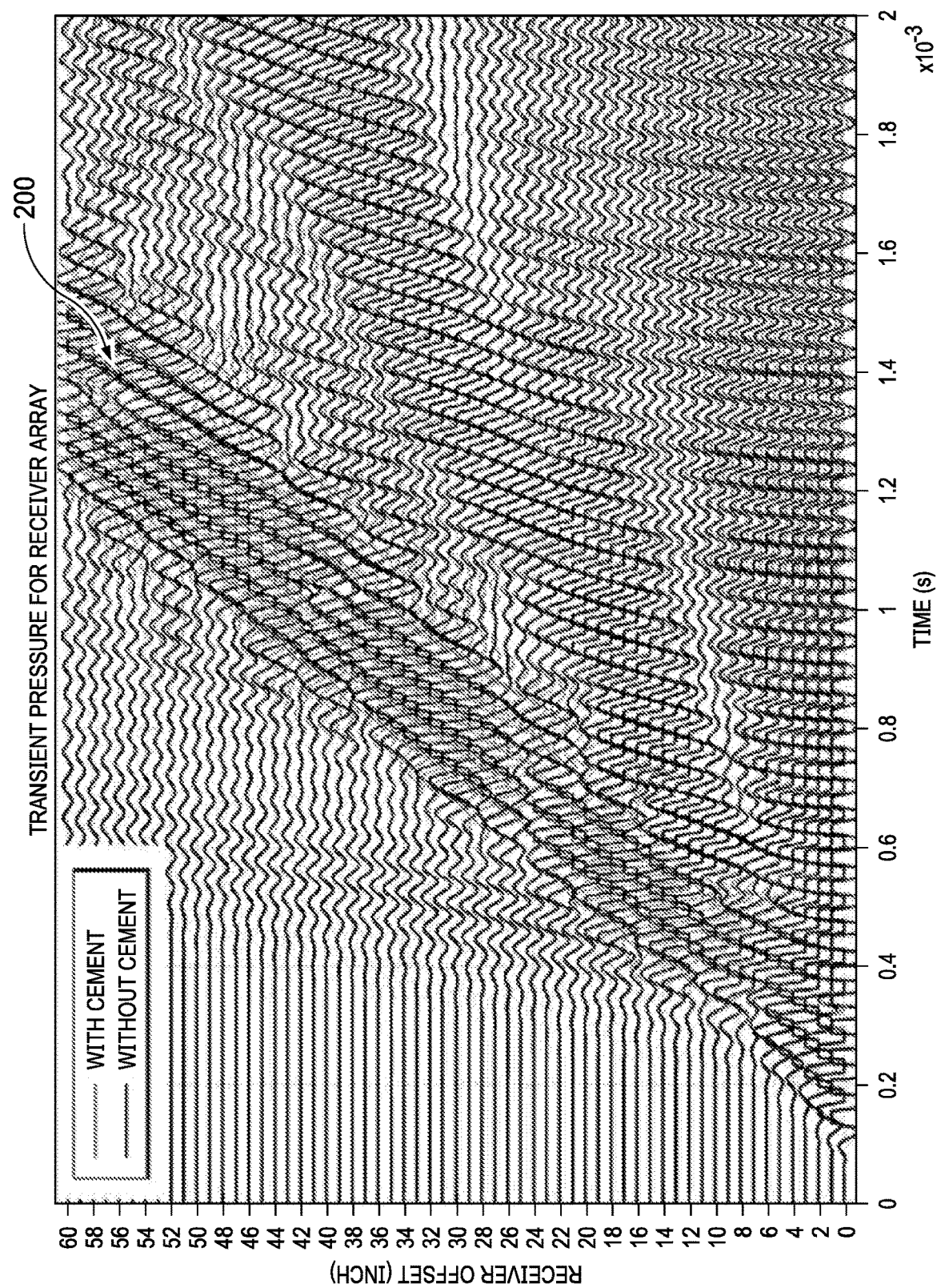
FIG. 2 illustrates a graph of a receiver array response.

FIG. 2 illustrates a receiver array response 200, in accordance with examples of the present disclosure. The receiver array response 200 may be acquired via receivers 104, as shown on FIG. 1, for example. The array response may be a transient pressure response based on receiver offsets and time in seconds (s), for example. As illustrated, received signals may become increasingly complex, as additional wellbore events/modes occur and as the separation between transmitter 102 to receiver 104 increases, as shown on FIG. 1, for example. Therefore, a shorter spacing between transmitter 102 to receiver 104 may simplify the received signal, hence its interpretation or data processing and inversion. However, with a shorter distance from transmitter 102 to receiver 104, there may be several measurement challenges to overcome. As previously noted, the axial spacing of receiver 104 from transmitter 102 may vary, for example, from about 0 inches (0 cm) to about 40 inches (101.6 cm) or more. In some examples, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102.

FIG. 3 illustrates a cross-sectional view of acoustic logging tool 100, in accordance with certain examples of the present disclosure. As illustrated, acoustic logging tool 100 may include a center mechanical load carrying pipe 300, which may traverse the length of acoustic logging tool 100. In some examples, modules may be disposed on center load carrying pipe 300 to form logging tool 100. A modular design may allow for acoustic logging tool 100 to be configured in any suitable manner. The load being carried may need to match the maximum tension load of a typical wireline cable. As illustrated, acoustic logging tool 100 may include a receiver module 302, one or more transmitter modules 304, and one or more mass modules 306. The mass modules 306 may include a steel mass block or a portion thereof. A typical mass block size may be limited by the choice of a center load carrying pipe diameter and outer diameter of the acoustic logging tool 100. In examples, receiver 104 is disposed in receiver module 302 and transmitter 102 is disposed in transmitter module 304. Each module disposed on acoustic logging tool 100 may be connected together by a press fitting/bolted or a sealed fitting. This type of connection may reduce and/or prevent the movement of acoustic waves up and down the length of acoustic logging tool 100. Additionally, contact area 308 between mass modules 306 and center load carrying pipe 300 may minimize direct acoustic energy coupling. Thus, borehole waves coupling onto the mass module 306 are trapped within the mass module 306 and very limited acoustic energy may be allowed to leak and travel along the body of acoustic logging tool 100 due to a small contact area. The contact area may need to be smaller than 5% of the surface area if the mass modules 306 and the center load carrying pipe 300 are fully bonded. Similarly, a tool wave propagating along the center load carrying pipe 300 may only leak less than 5% of its acoustic energy through direct contact into mass modules 306. Additionally, a mass cavity 310 which is a void of contact and material between center load carrying pipe 300 and mass module 306 may further reduce acoustic energy transfer between center load carrying pipe 300, mass module 304, and other modules that form acoustic logging tool 100. The mass cavity 310 may be a few tenths of micrometer (e.g., less than a micrometer, less than half a micrometer, or less than a quarter of a micrometer) thick as long as it prevents direct surface contact between the center load carrying pipe 300 and the mass modules 306.

FIG. 4A illustrates a close-up view of receiver module 302, one or more transmitter modules 304, and one or more mass modules 306, in accordance with some examples of the present disclosure. Within transmitter module 304 a transmitter 102 may be configured to chirp with a relatively 10 times lower voltage while sweeping across a frequency band. A typical firing voltage for a pulse is about several hundreds of volts. A cross-correlation may then be performed on a recorded waveform with the chirp signal in order to obtain an impulse response. As illustrated, a receiver module 302 is adjacent to and disposed between two transmitter modules 304. However, in some examples, the transmitter modules 304 may be spaced further apart from the receiver module 302 and other modules may be placed between the transmitter module 304 and the receiver module 302. The receiver module 302 may include the receiver 104, which may be circumferentially mounted to an outer surface of the receiver module 302, which may shield the receiver 104 from propagating tool waves.

Without limitation, borehole wave scattering may be minimized due to irregular shapes of the acoustic logging tool 100. For example, an irregular shape may include a cavity 400 disposed underneath a receiver 104 (i.e., a monopole PZT (lead zirconate titanate) ring). The size of this cavity depends upon the receiver crystal size of a typical 1 $cm^3$. Additionally, a signal conditioning electronic compartment 402 may be disposed next to the receiver 104. The signal conditioning electronic compartment 402 may be covered with a portion of a cylinder 407 that is a tubular portion of the body of the acoustic logging tool 100. The cylinder 407 may be made of steel or any suitable material as should be understood by one having skill in the art with the benefit of this disclosure. The steel cylinder 407 geometrically matches or is flush with a body 409 of acoustic logging tool 100 to reduce borehole acoustic interactions. A thickness of a wall of the steel cylinder 407 may be in the order of sub-millimeter to 1 or 2 millimeters as long as it does not affect those received signals.

Further illustrated in FIG. 4A, a mass-pipe acoustic isolation section 404 is extended beyond transmitter sections 304 in an up-hole and downhole direction, up to three feet (one meter) in distance, in order to separate potential tool wave reflections returning from tool joints 411 disposed up-hole and downhole from the acoustic logging tool 100, beyond a signal recording time window. In some examples, traditional wireline monopole transmitter packaging with a fluid cavity underneath may provide further challenges to measuring cement quality. One challenge may be that a tool cavity may induce reverberations, and a second challenge may be that the casing size and cement channel size may differ substantially, thus, additional bandwidth may be needed to cover all measurements. To address the bandwidth and cavity issue, a monopole ring (i.e., transmitter 102) is filled with a steel mass block 406 or a portion thereof, which is similar to a neighboring mass block. A typical mass block size may be limited by the choice of a center pipe diameter and outer diameter of the acoustic logging tool 100. In certain examples, an allowable space for containing the steel mass block 406 may be fully occupied or maxed out with the steel mass block 406. In some examples, an array of rubber O-rings 408, at least one PZT disk, or a rubber sleeve with an array of extruded rings to damp sharp resonances may be utilized in place of the steel mass block 406. The mass block 406 and/or the O-rings 408 may extend operating bandwidth of the acoustic logging tool 100 from 2 kilohertz (kHz) to 35 or 40 kHz, in some examples.

Measurement sensitivity may be boosted by subtracting and/or processing out signals that may always appear and remain the same (e.g., constant signals). For example, downhole equipment, such as tubing and casing may cause reverberations (e.g., constant signals). Without limitation, separating the detection of a vertical cement change (e.g., cement change occurring in lengthwise direction along a wellbore) from an azimuthal cement change increases sensitivity. For detecting changes in vertical cement conditions, a vertical dipole with centered receiver 104 may detect a cement change occurring lengthwise along a wellbore. Two matched transmitters 102 may emit or fire signals with opposite phases (e.g., in-phase and out-of-phase signals) to generate real time waveforms that indicate a vertical cement change. To quantify the cement change, both transmitters 102 may emit in-phase signals, and a model-based inversion may extract cement impedance. In some examples, an amplitude response may correlate to cement conditions. By arranging a ring receiver array of 8 elements or coils disposed between and in contact with two identical transmitters 102, a pitch-catch measurement may be transformed into a pulse-echo measurement, as should be understood by one having skill in the art, with the benefit of this disclosure. In some examples, waveforms collected in two neighboring depths may be subtracted when a monopole transmitter is utilized. It should be noted that the transmitter 102 may include several variations or configurations, such as utilizing a monopole antenna, for example.

Figure 4B:
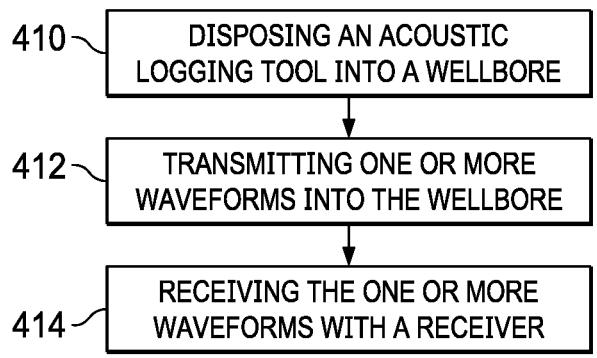
FIG. 4B illustrates an example of an operative flow chart.

FIG. 4B illustrates an exemplary flow chart depicting an operation of the acoustic logging tool 100 for identifying cement thickness, in accordance with some examples of the present disclosure. At step 410, the acoustic logging tool 100 may be disposed within the wellbore 110, as shown on FIG.

1, for example. At step 412, the acoustic logging tool 100 may transmit one or more signals or waveforms into the wellbore 110. At step 414, the acoustic logging tool 100 may receive the one or more signals or waveforms.

Figure 4C:
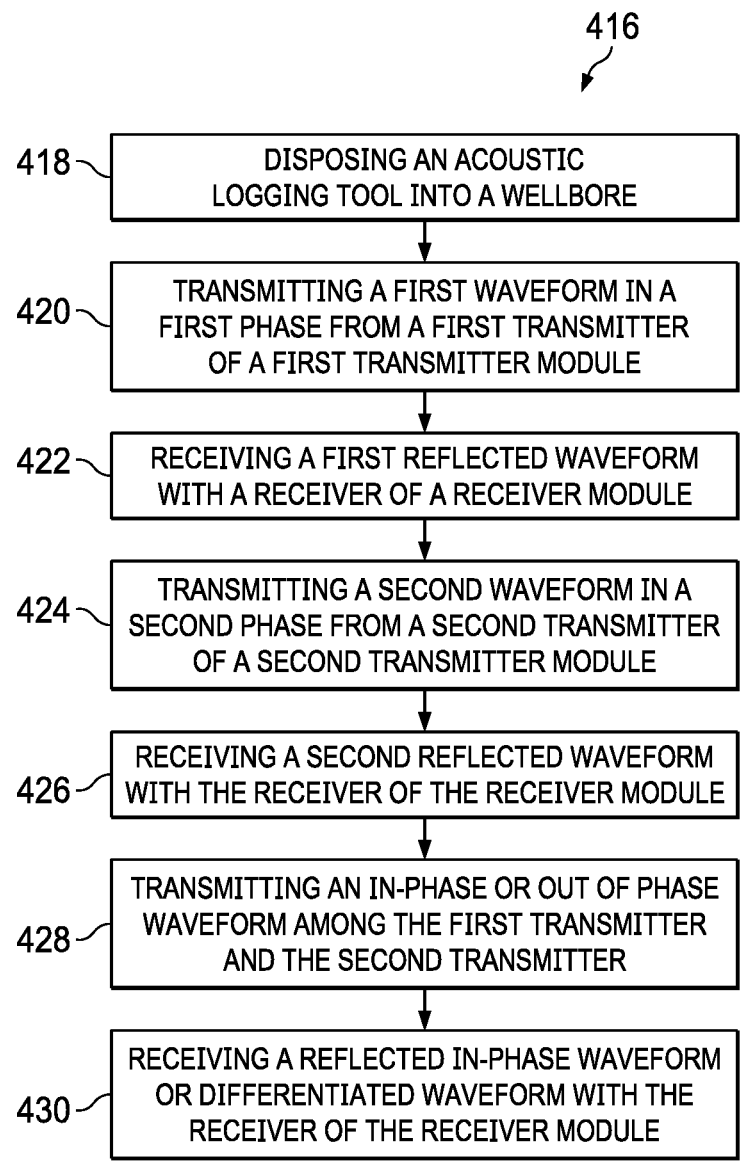
FIG. 4C illustrates another example of an operative flow chart.

FIG. 4C illustrates an exemplary flow chart 416 depicting another operation of the acoustic logging tool 100 for identifying cement thickness, in accordance with some examples of the present disclosure. At step 418, the acoustic logging tool 100 may be disposed within the wellbore 110, as shown on FIG. 1, for example. At step 420, the acoustic logging tool 100 may transmit a first waveform in a first phase from a first transmitter 102 of a first transmitter module 304, as shown on FIG. 4A, for example. At step 422, the acoustic logging tool 100 may receive a first reflected waveform with a receiver 104 of a receiver module 302, as shown on FIG. 4A for example. At step 424, the acoustic logging tool 100 may transmit a second waveform in a second phase from a second transmitter 102 of a second transmitter module 304, as shown on FIG. 4A for example. At step 426, the acoustic logging tool 100 may receive a second reflected waveform with a receiver 104 of a receiver module 302, as shown on FIG. 4A for example. At step 428, the acoustic logging tool 100 may transmit an in-phase or out of phase waveform among the first transmitter 102 and a second transmitter 102. At step 430, the acoustic logging tool 100 receives a reflected in-phase waveform or differentiated waveform with the receiver 104 of the receiver module 302, as shown on FIG. 4A for example.

Figure 5B:
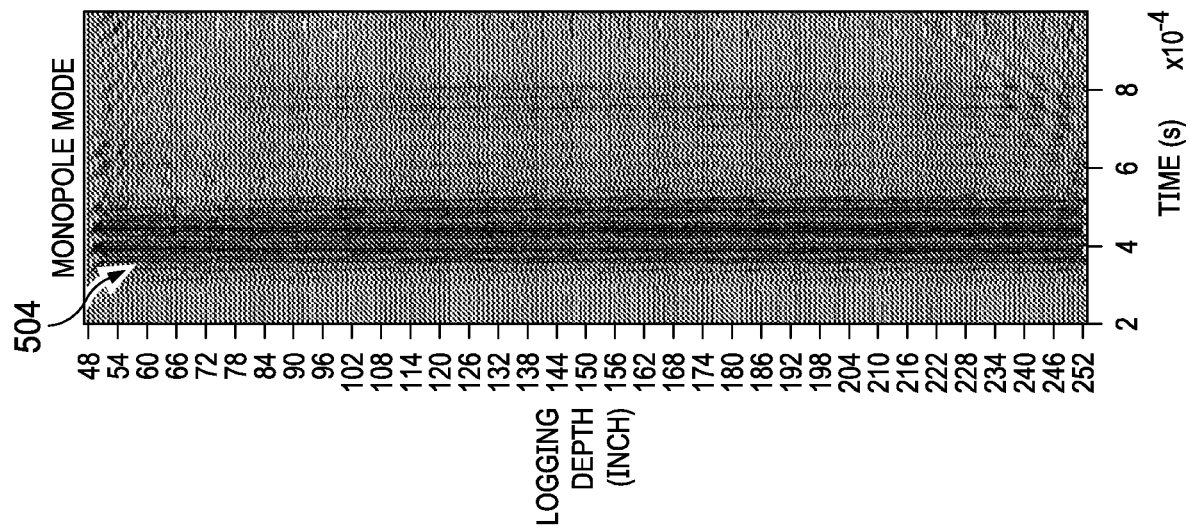
FIG. 5B illustrates monopole mode responses corresponding with the constant offset measurements of FIG. 5A.
Figure 5A:
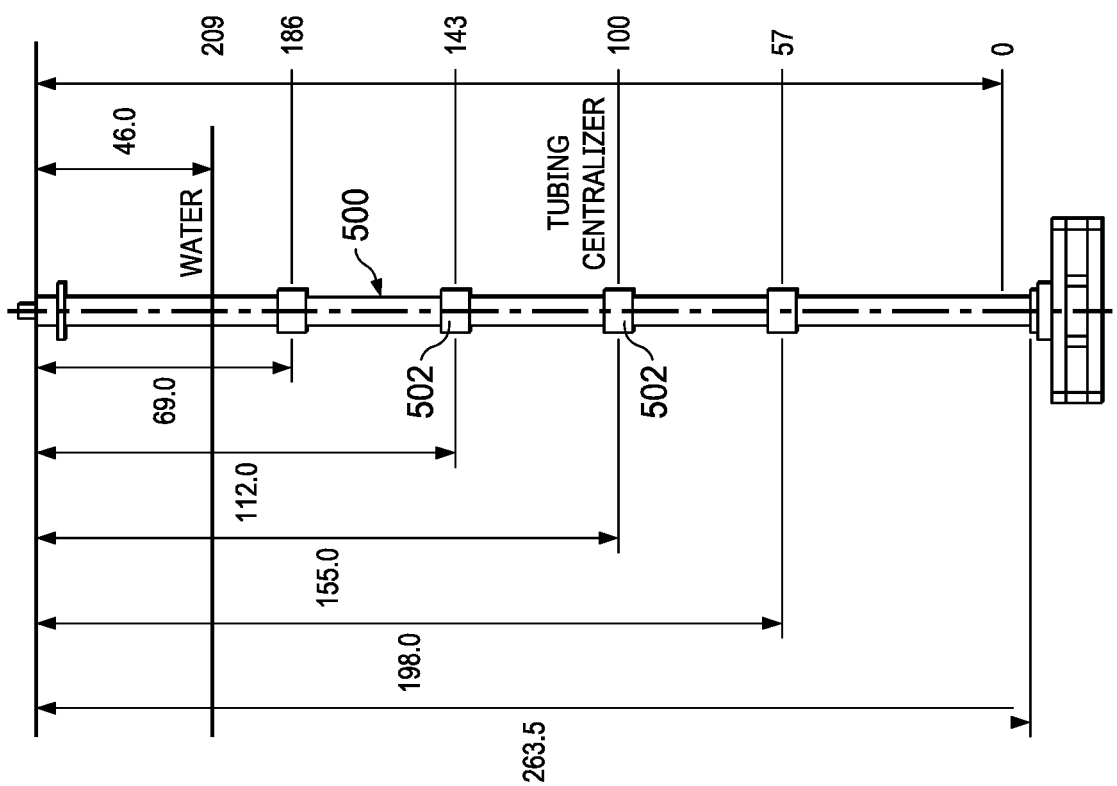
FIG. 5A illustrates constant offset measurements along a downhole tubular.

FIG. 5A illustrates constant offset measurements, in inches, between various locations along a downhole tubular or pipe 500 (e.g., production tubing) disposed within cement (not shown), in accordance with examples of the present disclosure. The various locations may include locations of tubing centralizers 502 that may be disposed along a length of the pipe 500, in some examples. The number at the right indicates the measurement height position from a measurement reference position of zero. However, logging depth at FIG. 5B and FIG. 6 flip the reference position to the surface.

FIG. 5B illustrates monopole mode responses corresponding with the offset measurements of FIG. 5A, in accordance with examples of the present disclosure. As illustrated on FIG. 5B, all boundaries 504 of cement thickness changes along the pipe 500, are identified. To resolve azimuthal cement condition changes, the acoustic logging tool 100 may be rotated, or the transmitter 102 (e.g., a unipolar transmitter) may be rotated, as shown on FIG. 1, for example. Similarly, a measurement may be taken according to an angular position of the acoustic logging tool 100. In some examples, if 360° wellbore measurements are unwrapped in 5° increments according to a tool-rotating angle, the result may be similar to a two-dimensional (2-D) seismic survey, except an operating frequency may be different. The tubing, fluid annulus, casing, and cement may resemble stratified layers, and appropriate signal processing may remove reflected events and multiples thereof, which may remain constant regardless of angle changes.

Figure 6:
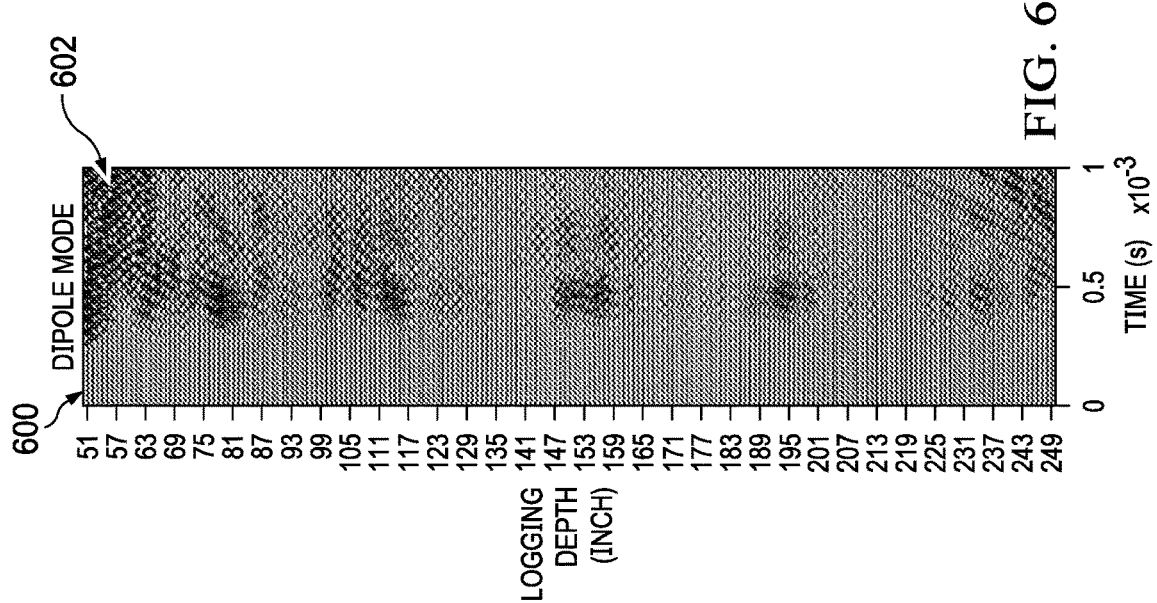
FIG. 6 illustrates a graph of dipole mode responses with neighbor subtraction.

FIG. 6 illustrates a graph 600 depicting dipole mode response differences 602 due to subtracting adjacent or neighboring responses, in accordance with examples of the present disclosure.

Figure 7:
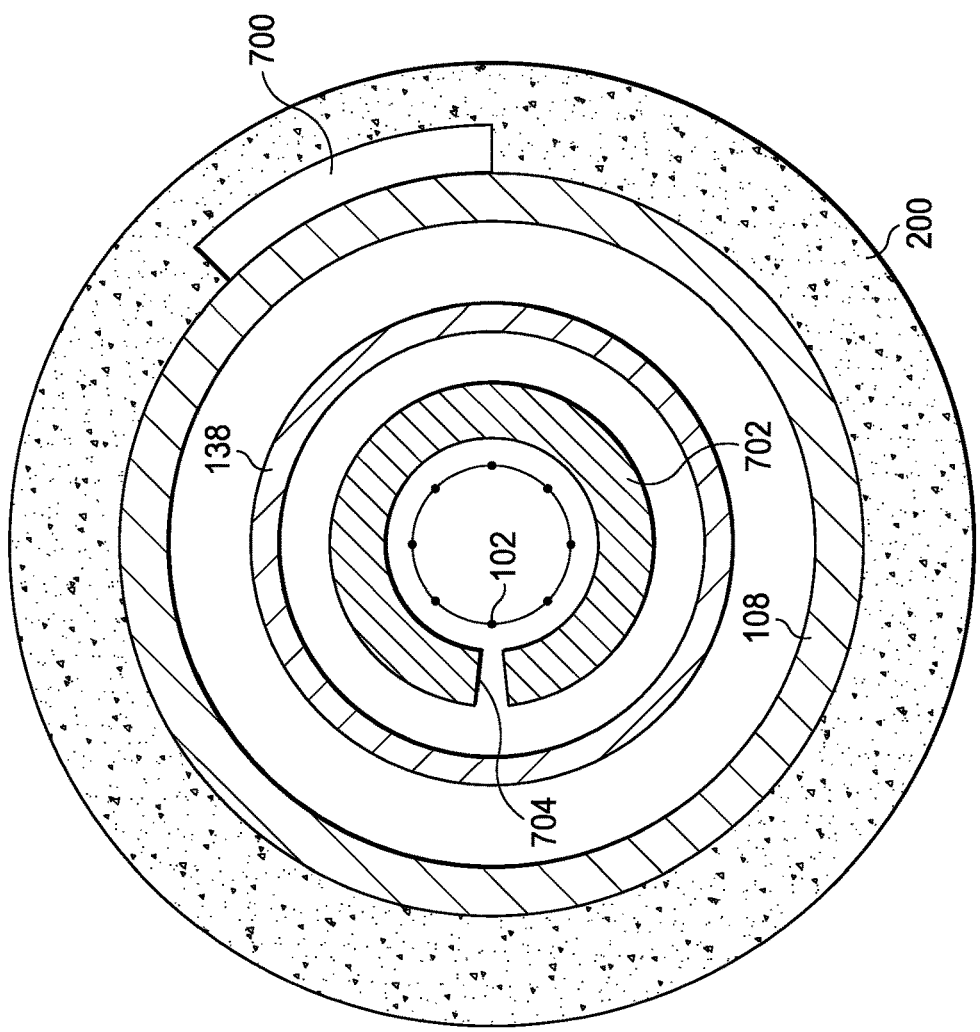
FIG. 7 illustrates a cross-sectional view of a cement channel with production tubing and casing.

FIG. 7 is a cross section view of a cement channel 700 with production tubing 138, casing string 108, and cement 137, in accordance with examples of the present disclosure. The cement channel 700 may be disposed at an angular position of a 45°, for example. The cement channel 700 may have a thickness ranging from 0.2 inch to 1 inch (0.5 cm to 2.5 cm). In certain examples, a tungsten cover with a cut-out window may be disposed over the transmitter 102 to configure the transmitter 102 as a unipolar transmitter. For example, as illustrated, the transmitter 102 may be disposed within a housing 702 with an angular cut-out window 704 for illumination. The housing 702 may have a diameter ranging from 1 to 4 inches (2.5 to 10.0 cm) and may be made of tungsten, for example. The production tubing 138 may have a diameter ranging from 3 to 5 inches (8.0 to 13.0 cm), for example. A thickness of the cement 137 may range from 1 to 3 inches (2.5 to 8.0 cm), for example.

Figure 8:
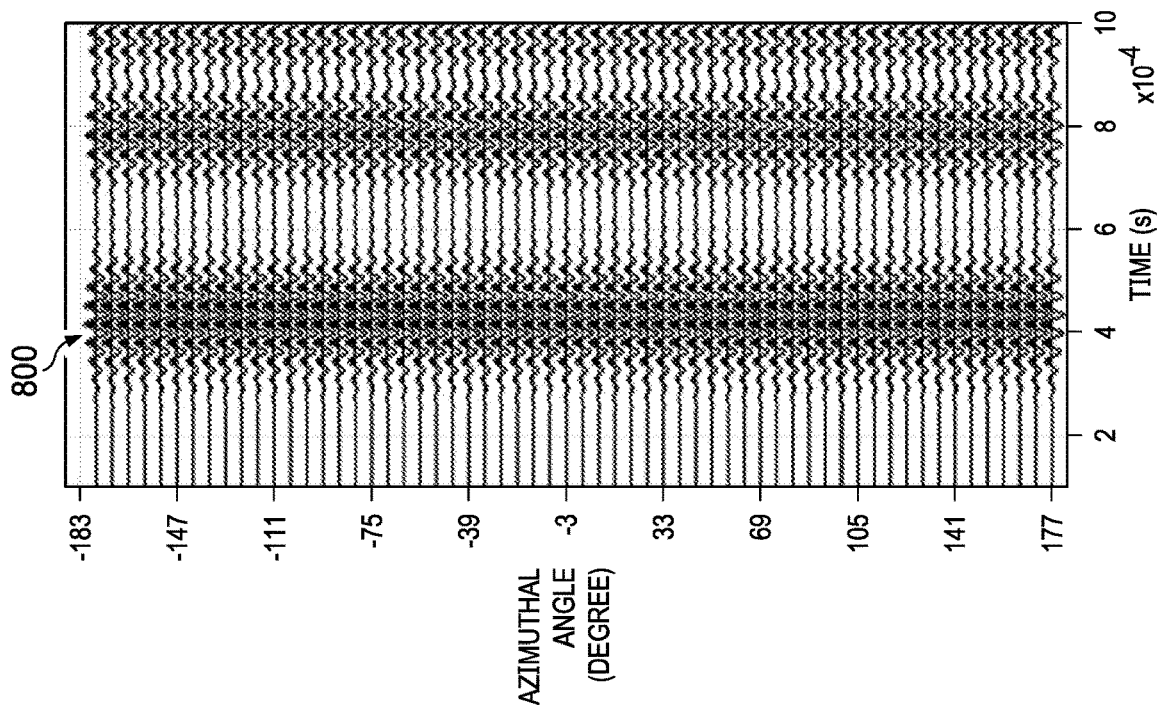
FIG. 8 illustrates a graph of an angular waveform.

FIG. 8 illustrates an angular waveform plot 800, in accordance with examples of the present disclosure. The waveform plot 800 may be caused by rotating a transmitter 102 which may be or include a unipolar transmitter, as shown on FIG. 3, for example. It should be noted that the transmitter 102 may include several variations or configurations, such as unipolar, for example.

Figure 9:
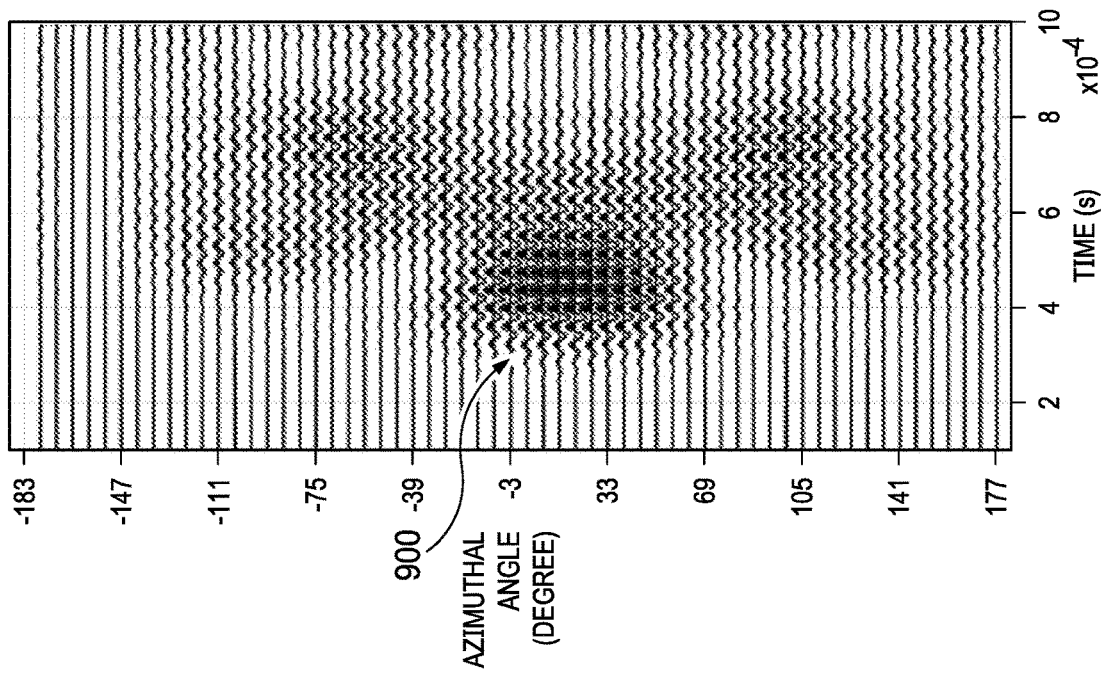
FIG. 9 illustrates a graph of a processed angular waveform of FIG. 8.

FIG. 9 illustrates processed angular waveforms 900 after removing unchanged reflections, in accordance with examples of the present disclosure. Therefore, a cement channel (e.g., the cement channel 700 shown on FIG. 7) may be clearly identified with this measurement configuration. In additional examples, there are several variations of the transmitter 102 that may be used to identify a vertical cement channel while rotating the transmitter 102, as shown on FIG. 3, for example. In some examples, the transmitter 102 may be or include an off-center monopole transmitter. A processing technique for azimuthal measurements may be utilized to subtract a monopole component from the waveform. The cement channel 700 may be visible after the processing, for example.

FIG. 10 illustrates a laboratory off-center monopole transmitter measurement, in accordance with examples of the present disclosure. As illustrated, a group of higher amplitude events 1000 at or around 0° with an arrival time of or about 0.5 milliseconds (ms) are illustrated. A second higher amplitude event group 1002 may be at or around 180°, which may be an out of phase event due to the nature of residual dipole components.

FIG. 11 illustrates processed results after removing a monopole component from received waveforms, in accordance with examples of the present disclosure. The group of higher amplitude events 1100 at or around 0° with an arrival time of or about 0.5 milliseconds (ms) are illustrated. The second higher amplitude event group 1102 is at or around 180° which may be an out of phase event due to the nature of residual dipole components. In examples, the actual position of a cement channel (e.g., the cement channel 700 shown on FIG. 7) may be determined by evaluating angular monopole amplitudes in FIG. 10. Without cement, a monopole reflection is stronger at an angle facing the cement channel. Additionally, some examples of the present disclosure include use of a horizontal dipole transmitter to generate a dipole response directly, allowing identification of the cement channel.

Figure 12:
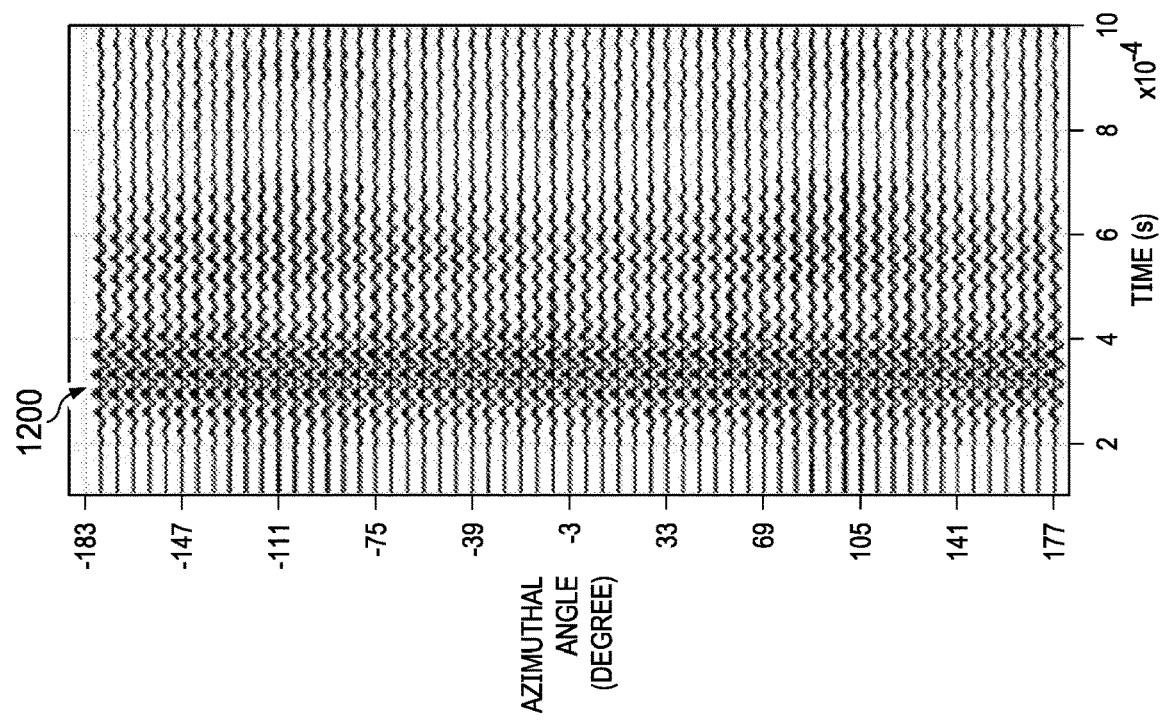
FIG. 12 illustrates a graph of simulated dipole measurements in a wellbore with a vertical cement channel.

FIG. 12 illustrates a simulated dipole measurement 1200 in a wellbore with a vertical cement channel, in accordance with examples of the present disclosure.

Figure 13:
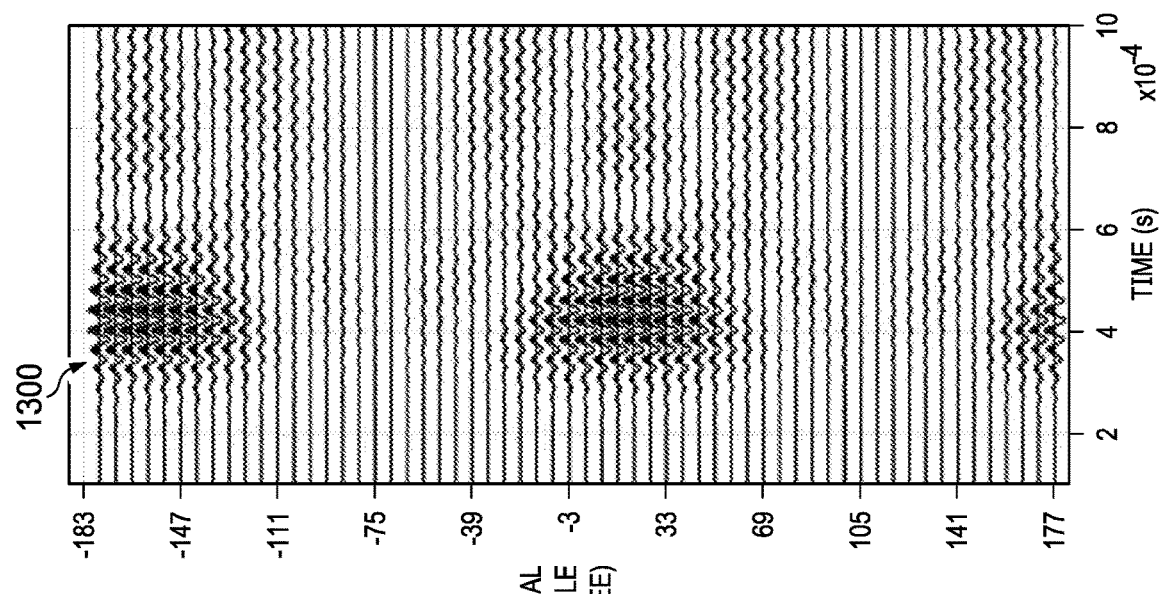
FIG. 13 illustrates a graph of processed results of FIG. 12 to identify one or more cement channels.

FIG. 13 illustrates processed results 1300 of the simulated dipole measurement 1200 of FIG. 12, to indicate a cement channel, in accordance with examples of the present disclosure. Improvements over current devices and methods may be found in the positioning of transmitters 102 and receivers 104 on the acoustic logging tool 100, as shown on FIG. 3, for example. Additionally, the acoustic logging tool includes an acoustic isolator that is a slotted sleeve. Additionally, the acoustic logging tool described above allows for the placement of a transmitter module next to a receiver module without concern for tool wave interferences, and prevents borehole wave coupling along the acoustic logging tool, which may also minimize reflection of the borehole wave along the acoustic logging tool. This may allow for an implementation of a true pulse-echo type measurement using a sandwiched receiver module, which may allow for signals to be useful for interpretation for a substantially longer time window before the tool joint reflection is received. Additionally, the construction of the acoustic logging tool may allow for a uni-pole source to determine azimuthal cement quality resolution.

Accordingly, the examples of the present disclosure may provide a direct indication of cement condition changes in vertical or azimuthal directions for Through Tubing Cement Evaluation (TTCE) applications. The examples may include any of the various features disclosed herein, including one or more of the following statements.

Statement 1. An acoustic logging tool comprising: a center load carrying pipe; a receiver module connected to the center load carrying pipe; one or more transmitter modules connected to the center load carrying pipe; and one or more mass modules connected to the center load carrying pipe.

Statement 2. The acoustic logging tool of the statement 1, wherein the receiver module includes one or more receivers.

Statement 3. The acoustic logging tool of the statement 1 or 2, wherein the one or more receivers are circumferentially mounted to an outer surface of the receiver module.

Statement 4. The acoustic logging tool of any of the preceding statements, wherein the one or more transmitter modules includes one or more transmitters.

Statement 5. The acoustic logging tool of any of the preceding statements, further comprising a contact area between each of the one or more mass modules that reduces direct acoustic energy coupling.

Statement 6. The acoustic logging tool of any of the preceding statements, further comprising a mass cavity that is disposed between the one or more mass modules and the center load carrying pipe.

Statement 7. The acoustic logging tool of any of the preceding statements, wherein the receiver module is disposed between the one or more transmitter modules on the center load carrying pipe.

Statement 8. The acoustic logging tool of any of the preceding statements, wherein the one or more mass modules are disposed along the center load carrying pipe and separated from the receiver module by at least one of the one or more transmitter modules.

Statement 9. The acoustic logging tool of any of the preceding statements, wherein the one or more mass modules, the one or more transmitter modules, and the receiver module are connected to each other individually by a press fit.

Statement 10. The acoustic logging tool of any of the preceding statements, further comprising a mass-pipe acoustic isolation section configured to prevent tool wave reflections returning from one or more tool joints above or below the receiver module.

Statement 11. The acoustic logging tool of any of the preceding, wherein an array of O-rings, one or more PZT disks, or a rubber sleeve may be disposed below a transmitter in the one or more transmitter modules.

Statement 12. A method for identifying cement thickness comprises disposing an acoustic logging tool into a wellbore, wherein the acoustic logging tool comprises: a center load carrying pipe; a receiver module connected to the center load carrying pipe; one or more transmitter modules connected to the center load carrying pipe; one or more mass modules connected to the center load carrying pipe; and transmitting one or more waveforms from a transmitter on the one or more transmitter modules into the wellbore; and receiving one or more received waveforms with a receiver on the receiver module.

Statement 13. The method of the statement 12, further comprising transmitting the one or more waveforms and receiving the one or more received waveforms at one or more depths.

Statement 14. The method of the statement 12 or 13, further comprising subtracting adjacent received waveforms from the one or more depths.

Statement 15. The method of any of the statements 12-14, wherein the transmitter is a unipolar transmitter.

Statement 16. The method of any of the statements 12-15, further comprising rotating the unipolar transmitter to perform one or more transmitter firings.

Statement 17. The method of any of the statements 12-16, wherein the transmitter is a monopole transmitter and the acoustic logging tool further comprises a tungsten cover disposed over each of the one or more transmitter modules.

Statement 18. A method for identifying cement thickness comprises disposing an acoustic logging tool into a wellbore, wherein the acoustic logging tool comprises: a center load carrying pipe; a receiver module connected to the center load carrying pipe; one or more transmitter modules connected to the center load carrying pipe; one or more mass modules connected to the center load carrying pipe; and transmitting a first waveform in a first phase from a first transmitter on a first transmitter modules into the wellbore; receiving a first reflected waveform with a receiver on the receiver module; transmitting a second waveform in a second phase that is opposite the first phase from a second transmitter on a second transmitter module; receiving a second reflected waveform with the receiver on the receiver module; transmitting an in-phase or out of phase waveform among the first transmitter and the second transmitter; and receiving a reflected in-phase waveform or differentiated waveform with the receiver on the receiver module.

Statement 19. The method of the statement 18, further comprising performing an inversion on the first reflected waveform, second reflected waveform, and the reflected in phase waveform to extract a cement impedance.

Statement 20. The method of the statement 18 or 19, further comprising identifying an amplitude from the inversion to determine one or more cement conditions.

The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. An acoustic logging tool comprising:
   a center load carrying pipe;
   a receiver module connected to the center load carrying pipe;
   one or more transmitter modules connected to the center load carrying pipe;
   one or more mass modules in contact with the center load carrying pipe, the one or more mass modules disposed along a circumference of the center load carrying pipe; and
   a void positioned beneath each of the one or more mass modules, wherein each void is defined by an interior circumferential portion of each mass module and an exterior circumferential portion of the center load carrying pipe.

2. The acoustic logging tool of claim 1, wherein the receiver module includes one or more receivers.

3. The acoustic logging tool of claim 2, wherein the one or more receivers are circumferentially mounted to an outer surface of the receiver module.

4. The acoustic logging tool of claim 1, wherein the one or more transmitter modules includes one or more transmitters.

5. The acoustic logging tool of claim 1, further comprising a contact area between each of the one or more mass modules that reduces direct acoustic energy coupling.

6. The acoustic logging tool of claim 1, wherein the receiver module is disposed between the one or more transmitter modules on the center load carrying pipe.

7. The acoustic logging tool of claim 6, wherein the one or more mass modules are disposed along the center load carrying pipe and separated from the receiver module by at least one of the one or more transmitter modules.

8. The acoustic logging tool of claim 7, wherein the one or more mass modules, the one or more transmitter modules, and the receiver module are connected to each other individually by a press fit.

9. The acoustic logging tool of claim 1, further comprising a mass-pipe acoustic isolation section configured to prevent tool wave reflections returning from one or more tool joints above or below the receiver module.

10. The acoustic logging tool of claim 1, wherein an array of O-rings, one or more PZT disks, or a rubber sleeve may be disposed below a transmitter in the one or more transmitter modules.

11. A method comprising:
    disposing an acoustic logging tool into a wellbore, wherein the acoustic logging tool comprises:
    a center load carrying pipe;
    a receiver module connected to the center load carrying pipe;
    one or more transmitter modules connected to the center load carrying pipe;
    one or more mass modules in contact with the center load carrying pipe, the one or more mass modules disposed along a circumference of the center load carrying pipe; and
    a void positioned beneath each of the one or more mass modules, wherein each void is defined by an interior circumferential portion of each mass module and an exterior circumferential portion of the center load carrying pipe; and
    transmitting one or more waveforms from a transmitter on the one or more transmitter modules into the wellbore;
    receiving one or more received waveforms with a receiver on the receiver module; and
    detecting changes in cement thickness along the wellbore and in azimuthal directions, with the one or more received waveforms.

12. The method of claim 11, further comprising transmitting the one or more waveforms and receiving the one or more received waveforms at one or more depths.

13. The method of claim 12, further comprising subtracting adjacent received waveforms from the one or more depths.

14. The method of claim 11, wherein the transmitter is a unipolar transmitter.

15. The method of claim 14, further comprising rotating the unipolar transmitter to perform one or more transmitter firings.

16. The method of claim 11, wherein the transmitter is a monopole transmitter and the acoustic logging tool further comprises a tungsten cover disposed over each of the one or more transmitter modules.

17. The method of claim 11, wherein the acoustic logging tool is disposed in tubing for through tubing cement evaluation (TTCE).

18. A method comprising:
    disposing an acoustic logging tool into a wellbore, wherein the acoustic logging tool comprises:
    a center load carrying pipe;
    a receiver module connected to the center load carrying pipe;
    one or more transmitter modules connected to the center load carrying pipe;

one or more mass modules connected to the center load carrying pipe; and a void positioned beneath each of the one or more mass modules, wherein each void is defined by an interior circumferential portion of each mass module and an exterior circumferential portion of the center load carrying pipe;

transmitting a first waveform in a first phase from a first transmitter on a first transmitter modules into the wellbore;

receiving a first reflected waveform with a receiver on the receiver module; transmitting a second waveform in a second phase that is opposite the first phase from a second transmitter on a second transmitter module;

receiving a second reflected waveform with the receiver on the receiver module;

transmitting an in-phase waveform from the first transmitter and the second transmitter;

receiving a reflected in-phase waveform with the receiver on the receiver module; and detecting changes in cement thickness along the wellbore and in azimuthal directions, with the reflected waveforms.

19. The method of claim 18, further comprising performing an inversion on the first reflected waveform, second reflected waveform, and the reflected in phase waveform to extract a cement impedance.

20. The method of claim 19, further comprising identifying an amplitude from the inversion to determine one or more cement conditions.

* * * * *